(12) United States Patent
Ribeiro

(10) Patent No.: US 9,612,685 B2
(45) Date of Patent: Apr. 4, 2017

(54) FORCE-SENSITIVE TOUCH SENSOR COMPENSATION

(71) Applicant: Microsoft Technology Licensing, LLC, Redmond, WA (US)

(72) Inventor: Flavio Protasio Ribeiro, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 14/682,264

(22) Filed: Apr. 9, 2015

(65) Prior Publication Data

US 2016/0299628 A1    Oct. 13, 2016

(51) Int. Cl.
G06F 3/045     (2006.01)
G06F 3/041     (2006.01)

(52) U.S. Cl.
CPC .......... G06F 3/0418 (2013.01); G06F 3/0414 (2013.01)

(58) Field of Classification Search
CPC .................................................... G06F 3/0418
USPC ......................................................... 345/173
See application file for complete search history.

(56) References Cited

U.S. PATENT DOCUMENTS

| | | |
|---|---|---|
| 4,745,565 A | 5/1988 | Garwin et al. |
| 4,918,262 A | 4/1990 | Flowers et al. |
| 5,159,159 A | 10/1992 | Asher |
| 5,940,065 A | 8/1999 | Babb et al. |
| 7,158,122 B2 | 1/2007 | Roberts |
| 7,411,584 B2 | 8/2008 | Hill et al. |
| 8,248,081 B2 | 8/2012 | Maharyta et al. |
| 8,269,727 B2 | 9/2012 | Westerman |

(Continued)

FOREIGN PATENT DOCUMENTS

| | | |
|---|---|---|
| CN | 101639746 B | 4/2012 |
| EP | 2818989 A2 | 12/2014 |

(Continued)

OTHER PUBLICATIONS

Louis H. Buell Jr., "Finger Pad Interfacial Pressure Measurement with Fine Spatial Resolution", PhD Thesis, Feb. 2003, 61 pages.

(Continued)

*Primary Examiner* — Jason Olson
(74) *Attorney, Agent, or Firm* — Lempia Summerfield Katz LLC

(57) ABSTRACT

An electronic device includes a memory in which input instructions, force level assessment instructions, and output instructions are stored, and further includes a processor coupled to the memory. The processor is configured through execution of the input instructions to obtain measurement data for a user interaction with a force-sensitive touch sensor, the measurement data being indicative of position information for the user interaction, amplitude information for the user interaction, and size information for the user interaction. The processor is further configured through execution of the force level assessment instructions to apply force level calibration data to the amplitude information and the size information in a force level assessment of the user interaction, the force level calibration data varying with user interaction size. The processor is further configured through execution of the output instructions to provide an output in accordance with the force level assessment.

22 Claims, 4 Drawing Sheets

(56) References Cited

U.S. PATENT DOCUMENTS

| | | | |
|---|---|---|---|
| 8,766,925 B2 | 7/2014 | Perlin et al. | |
| 2011/0242038 A1* | 10/2011 | Kakuta | G06F 3/0418 345/173 |
| 2013/0234977 A1 | 9/2013 | Lin et al. | |
| 2013/0342501 A1 | 12/2013 | Molne et al. | |
| 2015/0002479 A1* | 1/2015 | Kawamura | G06F 3/0414 345/178 |
| 2015/0091859 A1 | 4/2015 | Rosenberg et al. | |
| 2015/0153897 A1* | 6/2015 | Huang | G06F 3/0481 345/173 |
| 2016/0092023 A1* | 3/2016 | Nakaya | G06F 3/0416 345/173 |

FOREIGN PATENT DOCUMENTS

| | | |
|---|---|---|
| WO | 2014018086 A1 | 1/2014 |
| WO | 2014018121 A1 | 1/2014 |

OTHER PUBLICATIONS

Rosenberg et al., "The UnMousePad—An Interpolating Multi-Touch Force-Sensing Input Pad", In Proc. SIGGRAPH '09/ACM Trans. Graph., Aug. 2009, 9 pages, https://dl.acm.org/citation.cfm?id=1531371, vol. 28, No. 3, Article 65.

"International Search Report & Written Opinion Issued in PCT Application No. PCT/US2016/024595", Mailed Date: Jun. 13, 2016, 13 Pages.

Min Li et al., "Pseudo-Haptics for Rigid Tool/Soft Surface Interaction Feedback in Virtual Environments", Mechatronics, Aug. 23, 2014, pp. 1092-1100, vol. 24, No. 8.

* cited by examiner

FORCE-SENSITIVE TOUCH SENSOR COMPENSATION

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
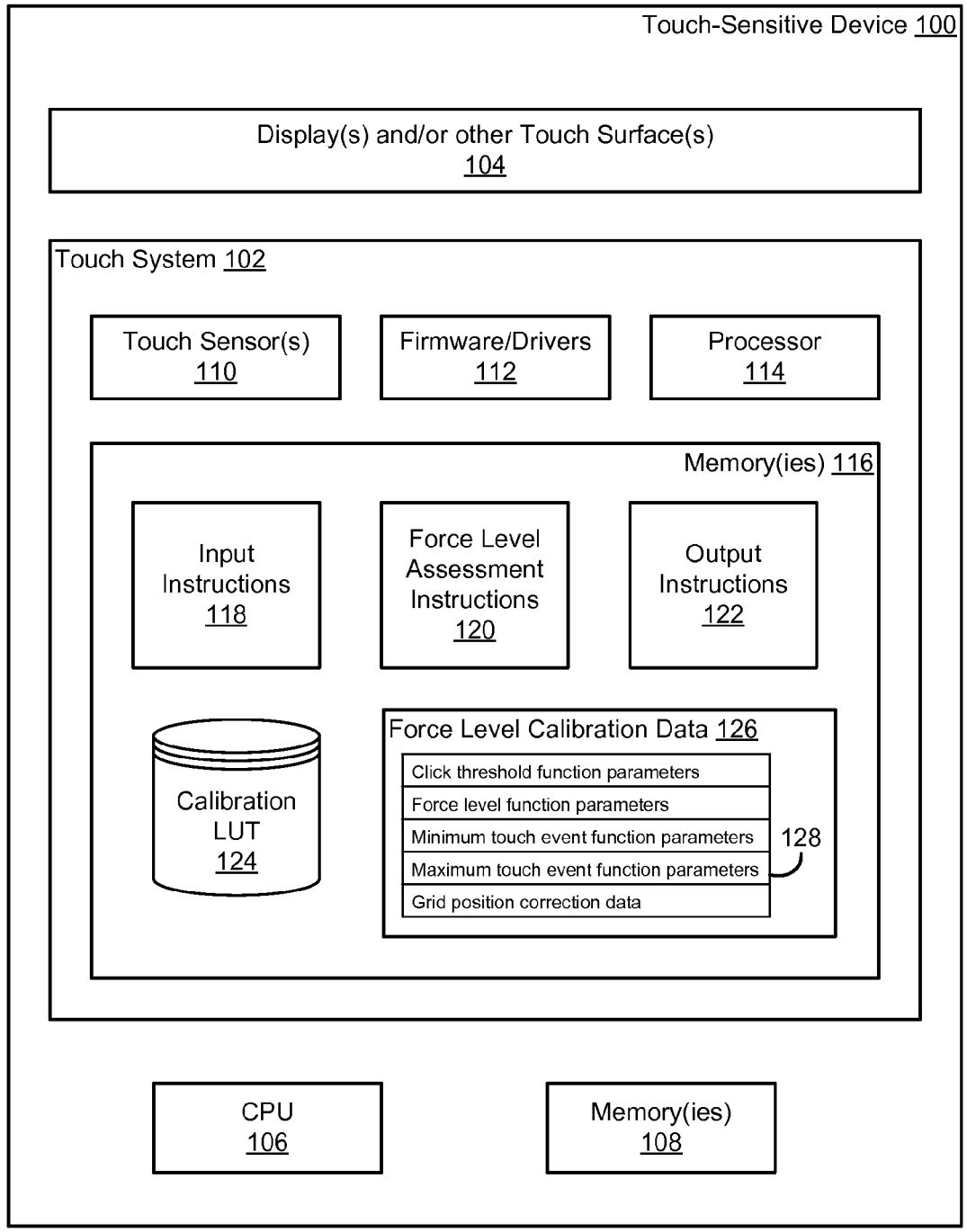
FIG. 1 is a block diagram of a system configured for force-sensitive touch sensor compensation in accordance with one example.

While the disclosed systems and methods are susceptible of embodiments in various forms, specific embodiments are illustrated in the drawing (and are hereafter described), with the understanding that the disclosure is intended to be illustrative, and is not intended to limit the invention to the specific embodiments described and illustrated herein.

DETAILED DESCRIPTION

Touchscreens and track pads often use capacitive, resistive, or other sensors to capture the location of a touch event. Electronic devices are configured with force-sensitive touch sensors that also provide an output related to the force of a touch event or other user interaction with the touch sensor. The force-sensitive touch sensors may also be used to capture location information. An assessment of the force level of a touch event is implemented in a manner that compensates for the contact size (e.g., area) of the touch event. The compensation may address a number of other factors that may lead to inaccurate output data, including, for instance, one or more environmental changes (e.g., temperature and humidity), electrical effects (e.g., coupling), and spatial effects arising from the sensor element grid, such as spatial aliasing and edge effects. In some applications, the compensation may be relied upon to provide accurate measurements of force level. The force level data may be provided in units of force rather than via a surrogate measurement, such as the magnitude of capacitive coupling.

Force-sensitive touch sensing may be compensated via force level calibration data. The force level calibration data may be applied to amplitude and contact size information for a touch event in a force level assessment of the touch event. Use of the force level calibration data may render the force level assessment independent of touch size (e.g., area). To that end, the force level calibration data varies with user interaction size. For example, the force level calibration data may specify the parameters of one or more functions of the amplitude and size of the touch event.

The compensation (e.g., via the functions or other force level calibration data) may model the force-sensitive touch sensor to support a number of different types of outputs or applications. For example, raw sensor data may be processed to capture button press events, such as click or other selection events. As used herein, button press events may involve various types of buttons, including both on-screen (e.g., displayed) buttons and physical buttons. In another example, raw sensor values from the force-sensitive touch sensor may be processed to provide an output indicative of force level, e.g., in absolute force units such as grams-force (gf). The button press event detection, force level determination, and/or other outputs may be provided in a manner that is independent of contact size (e.g., area). The force level and/or other output may thus not vary with finger size.

The compensation may provide gain and other adjustments and/or other corrections on-the-fly, i.e., during sensor operation. Automatic gain control may be provided, which may be useful in connection with a variety of different environmental and electrical effects. The corrections may address errors, such as spatial aliasing and edge effects, in the raw sensor data before the errors adversely affect the force level assessment.

The compensation of the force level assessments may provide a more consistent and accurate user experience. The user experience may be improved in ways that go beyond other types of touch sensor adjustments, such as sensor linearization. The accuracy of the force level assessments may greatly exceed those procedures that instead sum the amplitudes contributed by a grid of force-sensitive cells implicated by the touch event. Using both the amplitude information and the size (e.g., area) information may remove considerable amount of ambiguity and, thus, inaccuracy in the force level assessment. For example, using both amplitude and contact size may be used to accurately determine the force level of a touch event or other user interaction. The force level, for example, may be used to reject inadvertent touches in which the users' hand swipes across a touch sensitive surface, but to which the user does not apply much force into the surface. Detecting the force in addition to the size may help determine that the user did not intent to input a touch event.

Although described in connection with touch events, the nature of the user interaction with the force-sensitive touch sensor may vary. For example, the user interaction may involve a finger touch, a pen touch, or other user interaction with the touch sensor. A finger touch may involve any deliberate or intentional touch event involving a user's hand or other body part. Intentional touches are thus not limited to involving fingertips or fingers of the user. For example, a finger touch may involve the side of the thumb contacting the touch-sensitive surface, which may occur, for instance, during a two-finger zooming gesture. The touch may be direct or indirect. For example, the touch may be made with a gloved hand or otherwise clothed body part. A pen touch may involve a variety of different intentional touches involving a pen, stylus, or other object held by the user to interact with the touch sensor. The devices or systems may be configured for use with various distinct or tagged physical objects, including pucks, specialized tools such as brushes or airbrushes, mobile devices, toys, and other physical icons or tangible objects. The term "user interaction" may include any interaction with a touch sensor. The user interaction may not include or involve direct physical contact. The interaction may be indirect. For instance, the touch sensor may be configured as a proximity sensor, such that a finger or other object hovering over the touch-sensitive surface may be detected. Touch events, by contrast, involve user interactions in which physical contact with the touch-sensitive surface is made.

The compensation techniques may be useful with a variety of electronic devices. The compensation techniques are compatible and useful in connection with any electronic device having one or more touch-sensitive surfaces or region, such as a touch screen, touch sensitive bezel, or touch-sensitive case or shell. Examples of touch-based electronic devices include, but are not limited to, touch-sensitive display devices connected to a computing device, touch-sensitive phone devices, touch-sensitive media players, touch-sensitive e-reader, notebook, netbook, booklet (dual-screen), or tablet type computers, game controller, or any other device having one or more touch-sensitive surfaces. The size and form factor of the electronic device may thus vary. For example, the size of the touch-sensitive surface may range from the display of a handheld or wearable computing device to a wall-mounted display or other large format display screen. However, the touch-sensitive surface may or may not be associated with, or include, a display or touchscreen. For example, the touch-sensitive surface may be provided as a track pad.

The compensation techniques are well-suited for use in connection with a variety of different touch sensing technologies. The touch-sensitive surface may alternatively use resistive, acoustic, optical, and/or other types of sensors. Touch-sensitive surfaces may thus alternatively detect changes in pressure, light, displacement, heat, resistance and/or other physical parameters. In one resistive example, the touch-sensitive surface may include a small-pitch force-sensing resistor array with conductive ink, the resistance of which changes as force is applied. Other force-sensing input mechanisms may be used, including, for instance, piezo-resistor arrays. The manner in which the force-sensitive touch sensing detect a size of a touch event may vary.

The touch sensor may combine force-sensitive touch sensing with other touch sensing technologies. For example, the touch-sensitive surface may detect an input device, such as a stylus or pen, in a passive and/or active manner that does not involve the force-sensitive touch sensing. An active pen may emit or retransmit a signal detected by the touch-sensitive surface. A passive pen may include a magnet or other object or material in, e.g., a stylus tip, that interferes with an electromagnetic field or other feature of the touch-sensitive surface for purposes of proximity detection. Other aspects of the nature of the touch sensor technology may vary.

FIG. 1 depicts an electronic device 100 configured to implement force-sensitive touch sensor compensation. The device 100 includes a touch system 102 and a touch-sensitive surface 104. The touch system 102 and/or the touch-sensitive surface 104 may be part of a display, e.g., as a touchscreen or other touch-sensitive display. Any number of touch-sensitive surfaces 104 may be included. The touch system 102 and the touch-sensitive surface 104 are configured as, or include, a force-sensitive touch sensor. In some cases, the touch-sensitive surface 104 may include one or more compressible layers (e.g., a foam layer) and one or more flexible layers to support the force-sensitive touch sensing. The displacement of the flexible layer relative to an electrode may support the force-sensitive touch sensing. The manner in which force-sensitive touch sensing is provided may vary. For example, the touch-sensitive surface 104 may include one or more flexible layers without any compressible layers.

In one capacitive force-sensitive touch sensor example, with a zero-force contact, a foam or other compressible layer is relaxed and acts as a spacer with known thickness and dielectric constant. Under force, the foam layer is compressed, such that the gap between the finger and the sensor electrodes reduces, and the effective dielectric constant increases, thereby producing a measurable and repeatable change in capacitance. The change in capacitance may be used to estimate force. In such capacitive touch sensors, the amplitude reported by each node along the touch-sensitive surface 104 is proportional to the change in mutual capacitance with respect to its baseline value.

In the example of FIG. 1, the device 100 also includes a processor 106 and one or more memories 108. In other examples, the touch system 102, the processor 106 and/or the memories 108 are provided separately, e.g., in a separate electronic device in communication with the electronic device having the touch-sensing components. The touch system 102 may serve as an interface or other intermediary between the touch-sensitive surface 104 and an operating environment supported by the processor 106 and the memories 108. The processor 106 may be a general-purpose processor, such as a central processing unit (CPU), a graphic processing unit (GPU), or any other processor or processing unit. Any number of such processors or processing units may be included. For example, the electronic device 100 may include a separate, additional processor dedicated to handling the processing load of the touch system 102, including implementation of the force-sensitive touch sensor compensation techniques described herein.

The touch system 102 may be communicatively coupled to the processor 106 and/or the memories 108 to provide measurement data for a touch event or other user interaction with the touch-sensitive surface 104. The measurement data may specify or otherwise be indicative of position information for the user interaction, amplitude information for the user interaction, and size (e.g., area) information of the user interaction. Additional information may be provided by the touch system 102 in connection with the measurement information. For example, the measurement data may be provided with data indicative of a touch event type and/or with data identifying a particular touch event or other user interaction. A touch event or other user interaction may be tracked by the touch system 102 over time rather than identified as a new event with each detection frame or interval.

The position information may specify or include position data for the user interaction. In some cases, the position data identifies a centroid or other central location for the user interaction. Alternatively or additionally, the position data may identify one or more grid locations of the sensor elements of the touch-sensitive surface 104 activated or otherwise involved in the user interaction. In such cases, a centroid for the user interaction may be determined via the processor 106 or other element of the device 100 from the grid location or other position data.

The amplitude information may specify or include amplitude levels (or values) for the sensor element(s) involved in the user interaction. The amplitude level may be provided in accordance with the units of the sensing technology. For example, the amplitude level may be representative of the capacitive coupling for the sensor element(s). In some cases, the amplitude level is provided as a digital count representative of an analog signal captured by the touch system 102. The touch system 102 may include one or more analog-to-digital converters to generate the digital count from the analog signal.

The amplitude level may be indicative of the amount of force applied to the touch-sensitive surface 104. As described below, however, the force level may not be determinable from the amplitude level alone. The force level may instead be determined from the amplitude level by compensating for the area or size of the user interaction. Other factors may also be incorporated into the force level assessment based on the amplitude information.

The size information may specify or include a size (e.g., area) for the user interaction. The size may be specified by one or more dimensional or other quantities. For example, the size may be specified by the length of a diameter, major axis, minor axis or other lateral dimension for the user interaction. Alternatively or additionally, the size may be specified by the area of the user interaction, which may be estimated via the length and width of the user interaction and/or other parameters. Other parameters may be provided by the size information to specify the user interaction size, including, for instance, the size or dimensions of a bounding box or volume for the user interaction. The size of the user interaction may be determined by the touch system 102, the processor 106, or other element of the device 100.

In the example of FIG. 1, the touch system 102 includes one or more touch sensors 110, firmware and/or drivers 112, a processor 114, and one or more memories 116. The processor 114 is communicatively coupled to each memory 116 and/or the firmware/drivers 112. The processor 114 is configured to obtain measurement data captured via the touch-sensitive surface 104. The measurement data is representative of a frame or time interval sensed via the touch-sensitive surface 104. The measurement data for each frame may include a matrix of values, or pixels, that together form an image of the extent to which touch events are occurring at the surface 104. Measurement data may be provided for each pixel and/or for each user interaction. The measurement data may include the raw output data of the touch sensor 110 and/or include a processed representation of the raw output data.

The manner in which the measurement data is obtained by the processor 114 may vary. For example, the measurement data may be received via the firmware/drivers 112 and/or be obtained by accessing the memory 116. In some cases, the firmware/drivers 112 may be configured to provide or act as a touch controller. For example, the firmware/drivers 112 may be configured to compute or otherwise determine one or more components of the measurement data, such as the size information, from the raw output data from the touch sensor(s) 110. Alternatively or additionally, the firmware/drivers 112 may provide analog-to-digital conversion and/or other processing of the raw output data. In some cases, one or more touch controller functions may be provided by the processor 114.

The measurement data may be alternatively or additionally obtained by the processor 106. In some cases, the processor 106 obtains the measurement data for purposes of implementing force-sensitive touch sensor compensation. In such cases, the processor 114 may be directed to controlling the sensor 110 and/or configured to implement one or more pre-processing or other tasks in preparation for the compensation. The processing of the measurement data and other aspects of the compensation techniques may be implemented by any combination of the processor 106 and the processor 114. In other examples, the device 100 includes a single processor (i.e., either the processor 106, the processor 114, or a different processor) for purposes of obtaining and processing the measurement data.

The configuration and arrangement of the touch system hardware in the device 100 may vary. For example, the touch sensor(s) 110 may or may not be configured to capture multiple touches concurrently, e.g., as a multi-touch sensor. The touch sensing technology used to detection user interactions may vary. Each touch sensor 110 may or may not be configured as a component of the touch-sensitive surface 104. For example, the touch sensors 110 may include one or more layers that form part of the touch-sensitive surface 104. The extent to which the touch-sensitive surface 104 is integrated with the touch sensors 110 may vary. In some cases, the touch sensors 110 are or include components separate and distinct from the touch-sensitive surface 104, such as in optical touch sensor systems. In one example, a device may include multiple sensors within the touch-sensitive-surface 104. In this example, a metal mesh or ITO capacitive touch sensor may be located on top of a foam-based capacitive force-sensing sensor. Some or all of the driver and other information provided via the firmware 112 may alternatively be stored in the memories 116.

The processor 106 and/or the processor 114 is configured to execute a number of instruction sets stored in the memory 108 and/or the memory 114. The instruction sets may be arranged as respective software modules. The modules or other instruction sets may be integrated to any desired extent. The instruction sets include input instructions 118, force level assessment instructions 120, and output instructions 122. Additional, fewer, or alternative instruction sets or modules may be provided. For example, an additional instruction set or module may be provided for automatic gain adjustment. In the example of FIG. 1, instructions for automatic gain adjustment are an integral part of the force level assessment instructions 120. The force level assessment instructions 120 may thus be considered to include one or more procedures directed to gain adjustment (or other elements) regardless of whether such procedures involve a force level assessment.

The processor 106 and/or the processor 114 may be configured through execution of the input instructions 118 to obtain measurement data for the user interaction with the touch sensor(s) 110. The measurement data may be obtained by receiving some or all of the measurement data from the touch system 102 or a component thereof. For example, the measurement data may be received via the firmware/drivers 112. Alternatively or additionally, the measurement data may be obtained by accessing the memories 116 and/or the memories 108. In some cases, some of the measurement data may be obtained through processing of other measurement data. For example, the size information may be obtained by analyzing the amplitude information in view of a noise floor. The area or size of the user interaction may then correspond with those portions (e.g., sensor elements) of the touch-sensitive surface 104 having an amplitude level above the noise floor. In some cases, such analysis is implemented by the firmware/drivers 112 of the touch system 102.

An amplitude level for the user interaction may be based on the user interaction size. The user interaction size may thus be used to determine an amplitude level for the user interaction. For example, once the size of the user interaction is determined, the amplitude level for the user interaction may be determined by finding the peak amplitude (e.g., relative to the noise floor) within the area corresponding with the user interaction size. Alternative or additional representations of the amplitude information within the area may be used. For example, the mean or median amplitude level within the area may be determined. The amplitude level may thus be determined by various components, including, for instance, the firmware/drivers 112, the processor 106, and/or the processor 114.

The input instructions 118 may also cause the processor 106 and/or the processor 14 to correct or otherwise adjust the measurement data in order to compensate for various spatial effects arising from the configuration of the touch sensor 110. The raw sensor data from the touch sensor 110 may be adjusted to correct for one or more of the effects based on the measured position of the user interaction. As described further below, one or more of the position information, the amplitude information, and the size information may be determined from the raw sensor data in accordance with a grid position indicated by the position data in the raw sensor data. For example, the position information may be determined by adjusting position data of the raw sensor data in accordance with the grid position indicated by the position data. In another example, the amplitude information and/or the size information may be determined by adjusting amplitude and size data of the raw sensor data in accordance with the grid position. Determining the measurement data in this manner may compensate for various spatial effects, such as spatial aliasing and/or edge effects, in preparation for any further processing or use of the measurement data. As a result, the force level determinations and/or other assessments provided by the compensation techniques may thus not reflect, or be otherwise adversely affected by, such spatial effects.

The processor 106 and/or the processor 114 may be configured through execution of the force level assessment instructions 120 assess a force level of the user interaction based on the amplitude information and the size information. To that end, force level calibration data may be applied to the amplitude information and the size information in a force level assessment of the user interaction. In some cases, the force level assessment includes or involves a determination of the force level for the user interaction. In other cases, the force level may not be directly or expressly determined. For example, the force level assessment may include or involve an assessment of whether the user interaction exceeds (or is greater than or equal to) a force level threshold. The force level threshold may be associated with a button press (or selection) threshold. In such cases, the force level of the user interaction is assessed by comparing an amplitude level indicated by the amplitude information with an amplitude threshold that corresponds with the force level threshold for a button press event. The force level assessment may alternatively or additionally include other assessments, including, for instance, assessments directed to automatic gain control for the touch system 102, examples of which are described below. Force level assessments directed to determining whether a touch event occurred may also be implemented. The processor 106 and/or the processor 114 may thus be capable of distinguishing between touch events and other user interactions, such as hover interactions, which may be useful, for instance, in connection with palm rejection.

The force level calibration data is used to compensate for effects arising from the size of the user interaction. In one aspect, the force-sensitive touch sensor compensation described herein is based on the recognition that the amplitude information measured by the touch sensor 110 may be dependent upon user interaction size, e.g., the area or size of the touch event. That is, for a given force level, the amplitude level measured by the touch sensor 110 may vary based on the size of the user interaction. Two fingers of different sizes (e.g., a child's finger and an adult's finger) may result in different amplitude levels despite applying the same force or pressure level to the touch-sensitive surface 104. The compensation provided via the force level calibration data may thus result in force level assessments that are invariant to contact area or size. The touch sensor 110 may thus effectively perform consistently for a given force level regardless of whether a child or an adult is applying the force to the touch-sensitive surface 104 of the device 100.

The amplitude threshold and other force level calibration data may reflect how the response of the touch sensor 110 varies with user interaction size. For example, in the case of a button press threshold assessment, the force level calibration data may specify amplitude level as a function of the user interaction size for the threshold force level for a button press event (e.g., 100 grams-force). Such force level calibration data may be stored via function parameters (e.g., coefficients of a polynomial function) and/or via a data set from which specific threshold values may be interpolated.

In one example, a force threshold, such as the force threshold for a button press event, may be defined via the force calibration data to partition the two-dimensional amplitude-size space into two regions. One region corresponds with sensor responses for all forces less than the force threshold. The other region corresponds with sensor responses for all forces exceeding the force threshold. The force threshold may thus be represented by a curve separating the two regions, an example of which is shown and described in connection with FIG. 3. The curve may be represented by a function of user interaction size. To determine whether a user interaction constitutes a button press event, the amplitude level indicated by the amplitude information may be compared with the amplitude level provided by the function (or other curve) given the size indicated by the size information for a particular user interaction.

In some cases, a different threshold is used to detect a button release. The button release threshold may also be defined via the force calibration data to partition the two-dimensional amplitude-size space into two regions. The button release threshold may thus be represented by a curve separating the two regions. The curve may be represented by another function of user interaction size. To determine whether a user interaction is indicative of a button release event, the amplitude level indicated by the amplitude information may be compared with the amplitude level provided by the function (or other curve) given the size indicated by the size information for a particular user interaction. The difference between the button press and button release thresholds establishes hysteresis for button press events.

In another example, the force calibration data may define a function, other curve, or other relationship that converts the amplitude and size data (e.g., an amplitude, size pair) indicated by the measurement data into a force level. For example, the force calibration data may specify the parameters of the function, such as the coefficients of a polynomial function of size and amplitude, that map the amplitude and size data to a force level. The output provided by the processor 106 and/or the processor 114 may thus be a calibrated force level measurement. The force level output may also be provided in units of force, e.g., absolute force units, such as grams force. The operating system or other application executing on the processor 106 may then have the benefit of an absolute force level measurement rather than an indirect or surrogate measurement not sufficiently representative of the true force level. The force calibration data may thus provide a more consistent user experience relative to systems that limited to, for instance, summing the amplitude counts over a certain size as a crude representation of force.

In the example of FIG. 1, the force level calibration data is stored in one or more calibration data structures 124, 126. The calibration data structures 124, 126 may be stored in the memory 116 and/or another memory. The format and other characteristics of the calibration data structures 124, 126 may vary in accordance with the type of force level assessment to be implemented. Two examples of calibration data structures are shown in FIG. 1 for ease in illustration and description. In some cases, however, the device 100 is only configured with a single calibration data structure. The two exemplary calibration data structures are a lookup table 124 and a set 126 of arrays. In some cases, the measurement data is applied to only one of the calibration data structures 124, 126. In other cases, more than one calibration data structure 124, 126 may be used. For example, one type of force level assessment may use the lookup table 124, while another type of force level assessment may use the database 126. Any one or more of the instructions sets 118, 120, 122 may cause the processor 106 and/or the processor 114 to access one or more calibration data structures 124, 126.

The array set 126 may include a respective array 128 for each function defined via the force level calibration data. Each array 128 may include a number of coefficients or other parameters that establish the function. In the example of FIG. 1, the array set 126 includes respective arrays for button press threshold function parameters, force level function parameters, minimum touch event function parameters, maximum touch event function parameters, and grid position correction data. In some cases, each of the function parameters in the arrays 128 may specify the coefficients of a polynomial function applied to the measurement data. Each polynomial function may be fit to model the response of the touch sensor 110. Examples of the functions are described and shown in connection with FIGS. 3 and 4. The grid position correction data may also include or specify an array of parameters for correcting or otherwise adjusting the measurement data for spatial and/or other effects. Any one or more of the functions or other calibration data sets may be alternatively or additionally set forth in the lookup table 124. For example, some or all of the grid position correction data may be set forth as a data set of correction factors for each possible grid position. Data sets may be useful in connection with those situations in which the data is not easily or adequately modeled by a polynomial or other function.

The processor 106 and/or the processor 114 may be configured through execution of the output instructions 122 to provide an output in accordance with the force level assessment. In some cases, the output may be provided to the processor 106. For example, the output may be provided to a process executing on the processor 106, such as a process of the operating system or an application. The destination of the output may vary considerably.

The content, nature, or other characteristics of the output may vary with the type of force level assessment. For example, the output may be indicative of a force level for the user interaction in some cases. In other cases, the output may be indicative of whether the force level of the user interaction is greater than or equal to a button press threshold. The output may alternatively or additionally specify whether the force level of the user interaction was within a range of force levels associated with touch events, which may be defined by minimum and maximum threshold functions of user interaction size. The output may include one or more of these output types.

In some cases, the output may be reached as a result of (or in accordance with) automatic gain adjustment of the amplitude level indicated by the amplitude information. The automatic gain adjustment may be implemented via one or more additional force level assessments. The gain adjustment may be provided through adaptive scaling by identifying when the touch system 102 is (or should be) operating over a known curve of its operating region. For example, the known curve may correspond with the zero (or minimum) force and the full-scale (or saturated) extremes of the force sensing scale. Once the touch system 102 recognizes one of those conditions, the adjustment may be provided by computing how much the runtime sensor amplitude levels (e.g., the raw amplitude data) deviate from the amplitude values obtained during calibration. The sensor response may then be adjusted accordingly over time, thereby allowing the touch system 102 to self-calibrate and track permanent or transient changes that affect sensor gain.

The gain adjustment may be useful in connection with touch sensors that exhibit non-linear behavior and other variability in output arising from environmental and/or other conditions. For example, environmental conditions, such as temperature, humidity and capacitive coupling to ground often change sensor response by about 20%. The sensor response may also vary over time due to aging effects. The automatic gain adjustment provides a way to compensate for such variance in sensor response without relying on environmental sensors to specifically measure these quantities. As a result, the touch system 102 may adapt to such environmental conditions without additional components and the costs associated with such components. The sensor response may be adaptively scaled over time via the automatic gain adjustment, allowing the touch system 102 to self-calibrate to address permanent and/or transient changes that affect sensor gain.

The automatic gain adjustment may use the same measurement data relied upon to support one of the types of outputs described above. As a result, the gain level of the touch system 102 may be adjusted during operation, e.g., on-the-fly as measurement data is obtained. The automatic gain adjustment may thus compensate for such behavior or variability in real-time. An optimal user experience may thus be continuously maintained during operation, regardless of whether the environmental conditions are changing transiently or permanently.

The sensor response may be adaptively scaled as a result of comparisons with one or more force level thresholds. The automatic gain control may thus be based on one or more force level assessments. In the example of FIG. 1, the thresholds specified via the force level calibration data are minimum and maximum touch event thresholds. Each threshold varies with user interaction size, as described and shown in connection with FIG. 3. Each threshold may be specified via a function of user interaction size. The minimum touch event threshold is indicative of a minimum force level for a touch event (e.g., characteristic of contacts applying about 5 grams-force). The maximum touch event threshold is indicative of a maximum force level for a touch event (e.g., characteristic of contacts applying about 300 grams-force). The thresholds may thus be used for other purposes, e.g., to characterize a user interaction as a touch event or other some other type of interaction (e.g., a hover event). Other thresholds may be used. For example, the thresholds may not be associated with minimum and maximum force levels, but rather levels offset a desired amount (e.g., 5%) therefrom.

Figure 3:
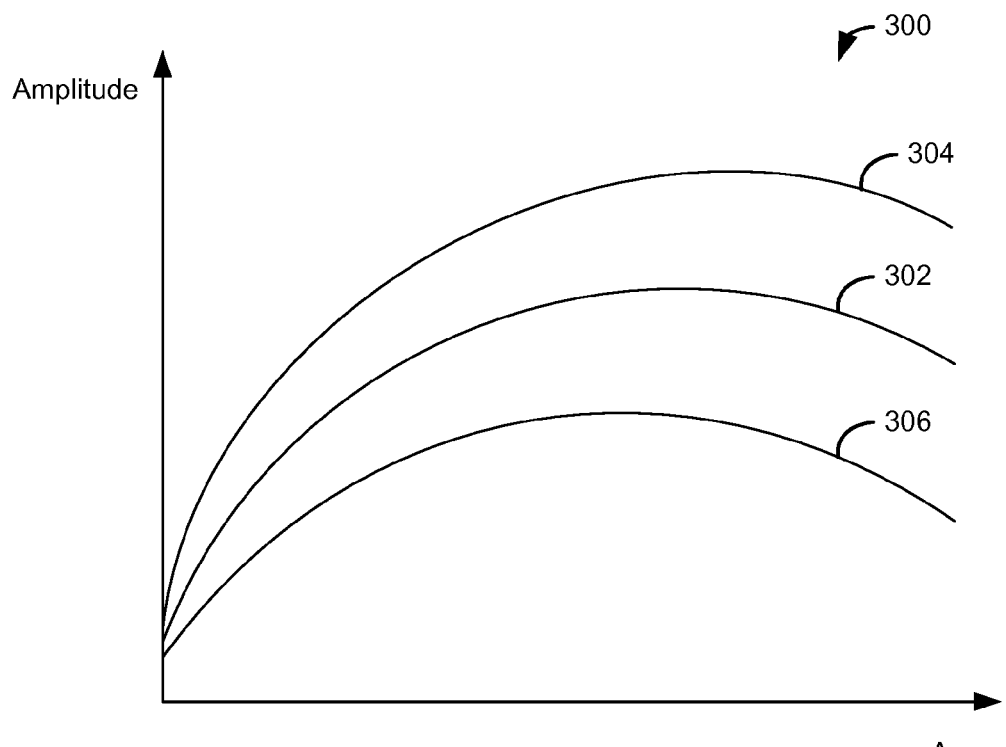
FIG. 3 is a graphical plot of force level calibration data for various force level assessments in accordance with one example.

In the example of FIG. 1, the automatic gain control is provided via implementation of the force level assessment instructions 120. The force level assessment instructions 120 configure the processor 114 and/or the processor 106 to compare the amplitude level indicated by the measurement data (e.g., amplitude information) with a minimum touch event threshold. In the example of FIG. 3, the minimum touch event threshold is a function of the touch area. If the position information of the user interaction is indicative of a smoothly moving touch event, the gain of the touch system 102 may be adjusted if the amplitude level indicated by the measurement data (e.g., amplitude information) is offset from the minimum touch event threshold. This adjustment is based on the recognition that when a user is swiping or otherwise moving a finger along the touch-sensitive surface 104, the force applied to the touch-sensitive surface 104 is likely to correspond with, or at least closely approximate, the minimum force level for a touch event. Users have, through experience with touch sensors, adapted their behavior to minimize the friction arising from interaction with the touch-sensitive surface 104. Based on this recognition, any offsets from the minimum touch event threshold may be used to correspondingly adjust the gain of the touch system 102.

The speed and/or extent to which the gain is adjusted may depend on how likely the user is to be applying the minimum force. For example, the force level assessment instructions 120 may cause the processor 114 and/or the processor 106 to determine whether the touch event is moving and, in so doing, determine the speed of the movement. The gain may then be adjusted more quickly or to a greater extent in connection with faster movement. As the touch event speed increases, the adaptation rate (and/or the extent of the adaptation) may increase accordingly, because the user is more likely to be applying less force.

In some cases, the automatic gain control is not based on size data for the user interaction. For example, an automatic gain adjustment may be triggered by comparing the amplitude data with an amplitude threshold that does not vary with user interaction size. The amplitude threshold may be a fixed threshold.

The maximum touch event threshold may also be used to support the automatic gain control. The adjustments provided via the maximum touch event threshold may be in addition or as an alternative to the adjustments provided via the minimum touch event threshold. In this case, the amplitude level indicated by the raw sensor data may compared with the maximum touch event threshold when the raw sensor data appears to be, or is likely, indicative of a saturated touch event. For example, a touch event may be considered to be saturated when the amplitude level does not change over time as the contact area or size changes (e.g., increases). Saturation may alternatively or additionally be associated with a certain amplitude level, such as a peak amplitude level or other significantly high amplitude. If the measurement data is indicative of a saturated touch event, then the gain may be adjusted if the amplitude level indicated by the amplitude information is offset from the maximum touch event threshold.

The compensation supported by the force level calibration data may address other non-linear behaviors of the touch sensor 110. For example, capacitive and resistive sensors have unavoidable edge effects. Spatial nonlinearities in multi-touch resistive force sensors often arise from the nonlinear nature of beam/plate bending mechanics. Nonlinearities in multi-touch capacitive force sensors are created from nonlinear variations of electric flux density with distance. For example, mutual capacitance sensors work because grounded fingers disrupt fringing electrical fields. The intensity of these fields rolls off non-linearly with distance and is very dependent on electrode geometry. Resistive and capacitive multi-touch sensors have nodes arrayed over rectangular grids, whose pitch may be only slightly smaller than a typical contact size. The discrete nature of the grid produces location dependent errors for all measured quantities (including centroid, amplitude and size). Sensors have edges where the uniformity assumptions break down. For example, a finger located inside the sensor is generally detected by multiple nodes, while a finger located over an edge or corner is often detected by a single node. Such edge effects may again produce errors and introduce biases for one or more measured quantities.

These non-linearities may be addressed by correcting or adjusting the measurement data based on position (e.g., centroid). In some cases, the correction involves scaling one or more values of the measurement data. For example, a spatially-dependent gain factor may be applied to raw sensor data values. Any combination of one or more of the position data, the amplitude data, and the size data may be scaled. The correction(s) or adjustment(s) may be implemented before the implementation of the force level compensation procedures described herein. For example, the measurement data may be adjusted during implementation of the input instructions 118, before implementation of the force level assessment instructions 120. As a result of the correction(s), the accuracy of the various force level assessments may be improved.

Figure 2:
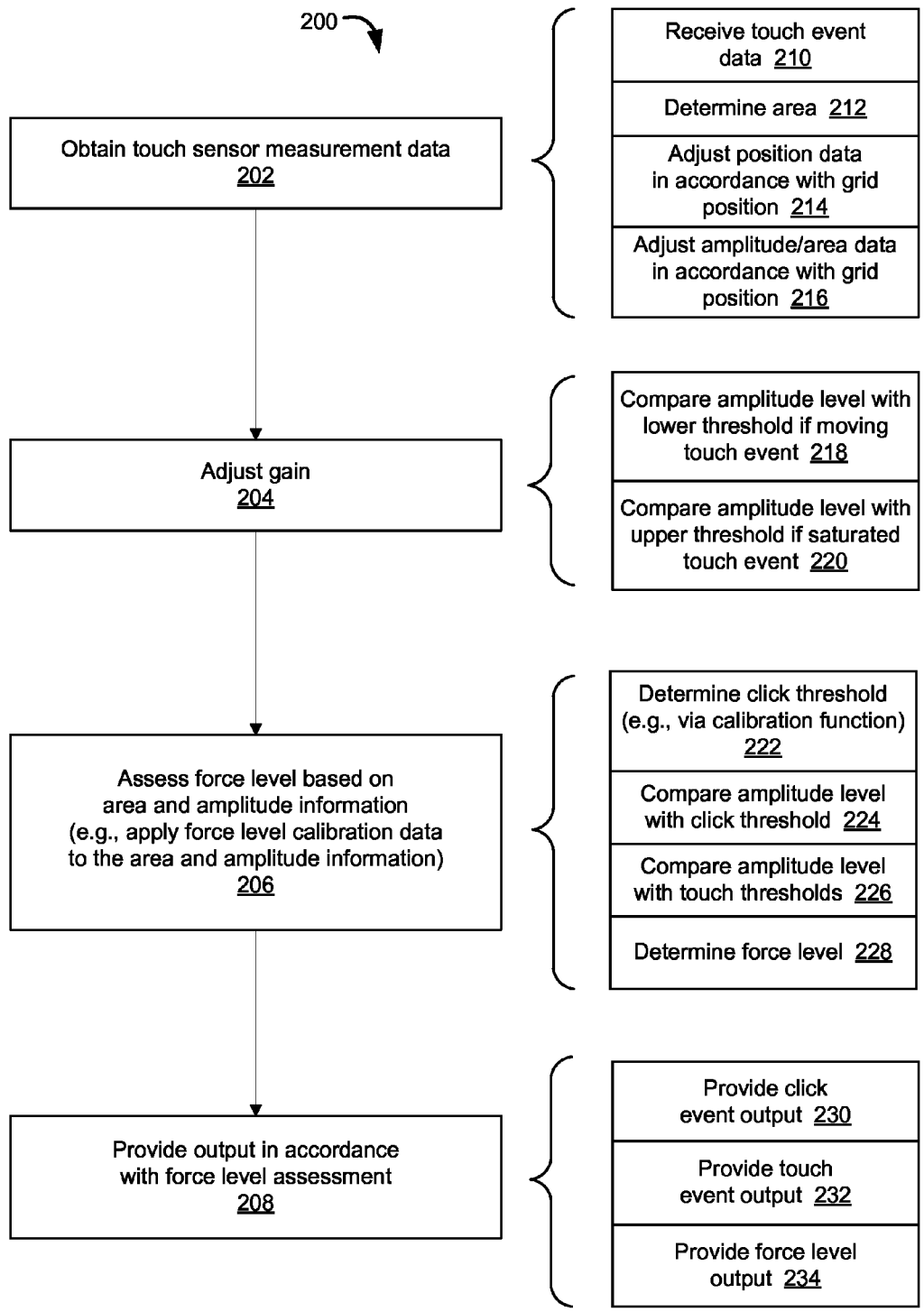
FIG. 2 is a flow diagram of a computer-implemented method for force-sensitive touch sensor compensation in accordance with one example.

FIG. 2 depicts an exemplary method 200 for force-sensitive touch sensor compensation. The method is computer-implemented. For example, one or more processors of the electronic device 100 shown in FIG. 1 and/or another electronic device may be configured to implement the method or a portion thereof. The implementation of each act may be directed by respective computer-readable instructions executed by a processor of the touch system 102 (FIG. 1), the device 100, and/or another processor or processing system. Additional, fewer, or alternative acts may be included in the method. For example, the method 200 may not include acts directed to automatic gain control.

The method 200 may begin with one or more acts related to capturing raw sensor measurement data. The manner in which the measurement data is captured may vary. The measurement data may be captured by a different device or processor and/or in connection with a different method implemented by the same processor or device implementing the method 200. For example, the measurement data may be captured by a track pad, game controller, or other device in communication with the processor implementing the method 200.

In the example of FIG. 2, the method 200 begins with an act 202 in which the touch sensor measurement data is obtained for a touch event or other user interaction. The measurement data is indicative of position information for the user interaction, amplitude information for the user interaction, and size information for the user interaction. The measurement data may be representative of a frame or interval captured by the force-sensitive touch sensor. The act 202 may include receipt of the measurement data directly from the hardware or other component(s) of the touch system 102, such as the firmware 112 (FIG. 1). Alternatively or additionally, the frame data may be obtained by accessing a memory, such as the memory 108 (FIG. 1) and/or the memory 116 (FIG. 1) and/or another memory. The touch sensor measurement data may be corrected or adjusted in accordance with one or more compensation procedures at this stage. The corrections or adjustments may address one or more spatial effects.

Adaptive and automatic gain control may be implemented on the measurement data for the user interaction in an act 204. The measurement data may include or represent raw sensor data and/or reflect measurement data that has already been corrected or adjusted via one or more compensation procedures. An amplitude level indicated by the measurement data may be scaled or adjusted in accordance with an adjustment to the gain applied by, for instance, a touch controller or processor in communication with the touch controller. The gain adjustment may be implemented in accordance with the extent to which the amplitude level is offset from the level to be expected from force level calibration data for the touch sensor. The expected force levels may correspond with minimum and maximum force levels for a touch event. The minimum and maximum force levels are established via the force level calibration data for a range of user interaction areas (or sizes). For example, the minimum and maximum force levels may be specified via function of user interaction size.

In act 206, a force level assessment for the user interaction is conducted based on the size and amplitude information of the measurement data. The size and/or the amplitude data may include or represent raw sensor data and/or reflect measurement data that has already been corrected or adjusted via one or more compensation procedures. The amplitude data may also have been adjusted in accordance with the automatic gain adjustment implemented in the act 204. In the example of FIG. 2, the force level assessment includes applying force level calibration data to the amplitude information and the size information. The force level calibration data varies with user interaction size. For example, the force level calibration data may specify amplitude levels as a function of user interaction size. The force level assessment may or may not involve expressly determining an absolute force level for the user interaction. In some cases, the force level assessment may involve an evaluation of the force level relative to a button press threshold (e.g., a threshold of 100 grams-force) via a comparison of the amplitude level and the amplitude threshold for the button press threshold at a given user interaction size. The force level may be evaluated against other thresholds in other force level assessments, such as assessments that characterize the type of the user interaction. The force level assessments may thus be useful in determining whether a user interaction should be reported as a touch event.

An output in accordance with the force level assessment may be provided in an act 208. For example, the content of the output may be representative of the results of the force level assessment. In some cases, the output may be indicative of a force level in units of force. Alternatively or additionally, the output may be indicative of whether a button press threshold was met (e.g., exceeded or equaled), and/or indicative of whether a user interaction may be characterized as a touch event. Other output data or information may be provided, including, for instance, some or all of the measurement data. For example, data indicative of the centroid or other position information may be provided as output.

In the example of FIG. 2, obtaining the measurement data may include receiving touch event or other touch sensor data in an act 210. The touch sensor data may be or include raw sensor data and the raw sensor data after a desired amount of processing. For example, the raw sensor data may be filtered or otherwise processed by a touch controller before any compensation or force level assessment. The processing may or may not include an area or size determination for the touch event. In some cases, the size is determined in an act 212. In other cases, the area or size is determined by the touch controller and provided with the other measurement data indicative of position and amplitude information.

The position data may be adjusted in accordance with grid position in an act 214. For example, the centroid data for a touch event may be corrected to address spatial aliasing, edge effects and/or other non-linear behavior for the touch sensor. In some cases, the amplitude and/or size data may also be adjusted in an act 216 in accordance with grid position to address aliasing and/or edge effects. For example, the amplitude and/or size data may be corrected once the position data is corrected.

The position-based adjustments may be based on data collected over the active area of the touch sensor and/or over the area associated with a sensor element, the assumption being that the spatial effects are periodic given the sensor element pitch. A raster pattern may be used to generate a map of measurement data (position, amplitude, size), which may be used to correct measured values during run time. The resolution of the raster pattern may be substantially smaller than the horizontal and vertical sensor pitch of the touch sensor to avoid undersampling.

The automatic gain control of the act 204 may include one or more comparisons involving force level calibration data. The force level calibration data may be used to specify an expected amplitude level. The expected amplitude level may correspond with a threshold. In the example of FIG. 2, a comparison of the amplitude level with a lower (e.g., minimum) touch event threshold is implemented in an act 218 if the position data reflects a moving touch event. A comparison of the amplitude level with an upper (e.g., maximum) touch event threshold is implemented in an act 220 if the measurement data (e.g., the amplitude and size data) reflects a saturated touch event.

The gain may be slowly and/or iteratively adapted over time. In some cases, an estimate of measurement noise level may be used to control the speed at which the gain is adjusted. The time constant of the adaption rate may also be selected as appropriate given the conditions under which the underlying measurement data was obtained. For example, the time constant may be shorter in situations in which the touch event movement was faster, when the reference signal is assumed to be a zero-force interaction. Adjustments to the gain may also or alternatively be moderated by replacing the size-amplitude data with averaged, smoothed, or otherwise filtered versions thereof.

The force level assessment in the act 206 may include a number of comparisons and/or determinations based on the force calibration data and the measurement data for the user interaction. The measurement data may have been corrected or adjusted via the pre-processing compensation of the acts 214, 216 and/or via the touch sensor gain as adjusted by the compensation of the acts 218, 220. In the example of FIG. 2, the force calibration data may be used to determine in an act 222 a button press (or selection) threshold for a given user interaction size. The button press threshold is representative of a threshold force level, such as 100 gf, for a button press event. In some cases, the force calibration data may define a function of user interaction size via, e.g., a number of polynomial coefficients. The function may then be applied to the user interaction size specified by the size information of the measurement data to determine the button press threshold. The button press threshold may then be compared in an act 224 with the amplitude level indicated by the amplitude information of the measurement data. If the amplitude level exceeds or equals the button press threshold, then the user interaction may be reported as a button press.

The amplitude level of the user interaction may also be compared in an act 226 with the amplitude levels of the lower and upper touch event thresholds. These comparisons may be used to determine whether the user interaction should be reported or considered as a touch event (as opposed to, for instance, a hover event). The user interaction may be considered a touch event if the amplitude level falls between the two touch event thresholds for a given user interaction size. The two touch event thresholds may also be determined from the force calibration data via respective functions of user interaction size.

The force level assessment may alternatively or additionally include a determination of the force level in an act 228. The force level determination may include applying the force level calibration data to determine a force level in units of force that corresponds with the amplitude and size data specified via the measurement data. In some cases, the force level calibration data specifies a function of amplitude and size to which the measurement data may be applied to determine the force level.

The act 208 may include generating one or more different types of output data. An output may be provided in an act 230 that indicates that a button press event has occurred when the amplitude level exceeds or equals the button press threshold (or that a button press event has ceased to occur when the amplitude level no longer exceeds the button press threshold or a button release threshold). Alternatively or additionally, an output may be provided in an act 232 that indicates whether the user interaction is a touch event. Alternatively or additionally, an output may be provided in an act 234 that indicates an absolute force level for the user interaction.

The order of the acts of the method may vary from the example shown. For example, in some cases, the gain adjustment of the act 204 may be implemented after the force level assessment of the act 206. Some of the acts may alternatively be implemented in parallel or concurrently. For example, the acts 204 and 206 may be implemented concurrently.

FIG. 3 depicts a graphical plot of exemplary force level calibration data to be used in various force level assessments. In this example, the force level calibration data for three different force levels has been fitted to respective curves. The graphical plot shows that the amplitude level alone is not sufficient to determine the force level. That is, a given amplitude level may correspond with a range of force levels. The user interaction size may be used to resolve the ambiguity. The force level calibration data specifies a number of amplitude-size data pairs for a number of force levels.

In the example of FIG. 3, the force level curves may be represented by a non-monotonic function of user interaction size (e.g., area). The sensor response may thus present the same amplitude level for different user interaction sizes. The force level calibration data may thus be relied upon to make the sensor response data invariant to user interaction size. The curves may vary for other touch sensors. For instance, in other cases, the sensor response may be best or better fit by a monotonic function.

Each of the force level curves may define a force level threshold for a force level assessment. In this case, a curve 302 models the sensor response for touch events at an intermediate force level, such as the force level that may be used to distinguish between button press events and non-button press events. For example, the force level for the curve 302 may be about 100 gf. The curve 302 may thus be used as a button press threshold. Amplitude-size data pairs above the curve 302 are characterized or reported as button press events, while data pairs below the curve 302 are characterized or reported as non-button press events.

A curve 304 models the sensor response at an upper or maximum force level, such as 300 gf. The upper force level may correspond with the maximum force associated with a touch event. The curve 304 may thus be used as a maximum touch event threshold.

A curve 306 models the sensor response at a lower or minimum force level, such as 20 gf. The lower force level may correspond with the minimum force associated with a touch event. The curve 306 may thus be used as a minimum touch event threshold. Amplitude-size data pairs falling below the minimum touch event threshold are not characterized as touch events. Data pairs falling between the two curves 304, 306 are characterized or reported as touch events, e.g., with force estimates satisfying a prescribed accuracy.

The curves 302, 304, 306 may be composed of a number of actual (or underlying) calibration data points and/or be representative of a function fitted to the actual calibration data points. In some cases, each curve 302, 304, 306 may be a polynomial function having coefficients selected to best fit the calibration data. In the example of FIG. 3, each curve 302, 304, 306 is a respective parabolic function. The order of the polynomial function may vary from the example shown to, for instance, improve the modeling or fitting of the force level calibration data.

Figure 4:
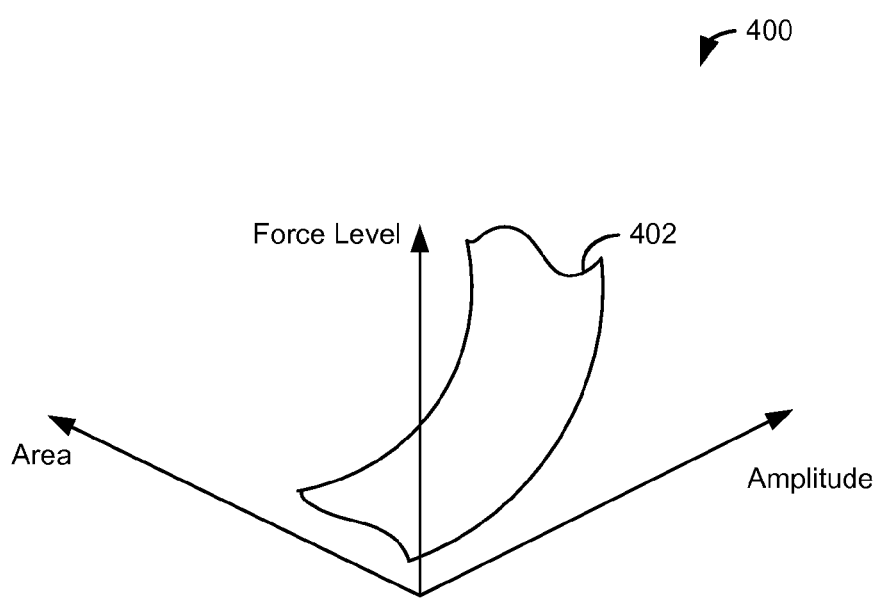
FIG. 4 is a graphical plot of force level calibration data for a force level assessment involving a force level determination in accordance with one example.

FIG. 4 depicts a graphical plot of force level calibration data that may be used to determine a force level for a given amplitude-size data pair. A curve 402 may be fit to the underlying calibration data so that a function that defines the curve may be used to determine the force level for the measurement data. The function may be a two-dimensional polynomial function, the coefficients of which are specified in the force level calibration data for use during a force level assessment. Alternatively, the curve 402 may be composed of a set of underlying calibration data points. The force level determination may then include or involve an interpolation between nearby data points.

The calibration data underlying the fitted curves shown in FIGS. 3 and 4 may be collected via a set of test fingers with diameters that cover a range of human finger sizes (e.g., about 5 mm to about 15 mm). The set of test fingers may include a number of fingers to provide sufficient granularity for the modeling or fitting. A robot may then be used to apply the test fingers to the touch-sensitive surface of the touch sensor being calibrated at various force levels.

The curves shown in FIGS. 3 and 4 may be realized via a variety of different modeling procedures. For example, a least-squares polynomial fitting procedure may be used.

Figure 5:
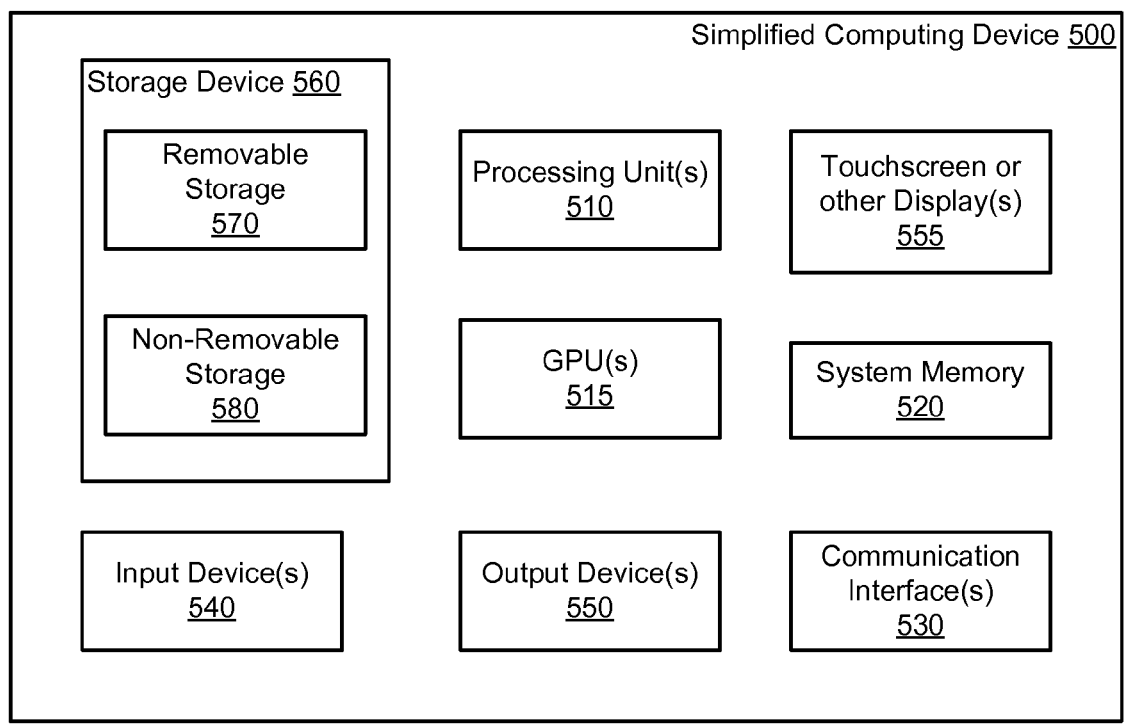
FIG. 5 is a block diagram of a computing environment in accordance with one example for implementation of the disclosed methods and systems or one or more components or aspects thereof.

With reference to FIG. 5, an exemplary computing environment 500 may be used to implement one or more aspects or elements of the above-described methods and/or systems. The computing environment 500 may be used by, incorporated into, or correspond with, the electronic device 100 (FIG. 1) or one or more elements thereof. For example, the computing environment 500 may be used to implement the touch system 102 (FIG. 1) or a host device or system in communication with the touch system 102. The computing environment 500 may be a general-purpose computer system used to implement one or more of the acts described in connection with FIG. 2. The computing environment 500 may correspond with one of a wide variety of computing devices, including, but not limited to, personal computers (PCs), tablet and other handheld computing devices, wearable computers, laptop or mobile computers, communications devices such as mobile phones, multiprocessor systems, microprocessor-based systems, set top boxes, programmable consumer electronics, network PCs, mini-computers, mainframe computers, audio or video media players, and game consoles.

The computing environment 500 has sufficient computational capability and system memory to enable basic computational operations. In this example, the computing environment 500 includes one or more processing unit(s) 510, which may be individually or collectively referred to herein as a processor. The computing environment 500 may also include one or more graphics processing units (GPUs) 515. The processor 510 and/or the GPU 515 may include integrated memory and/or be in communication with system memory 520. The processor 510 and/or the GPU 515 may be a specialized microprocessor, such as a digital signal processor (DSP), a very long instruction word (VLIW) processor, or other microcontroller, or may be a general purpose central processing unit (CPU) having one or more processing cores. The processor 510, the GPU 515, the system memory 520, and/or any other components of the computing environment 500 may be packaged or otherwise integrated as a system on a chip (SoC), application-specific integrated circuit (ASIC), or other integrated circuit or system.

The computing environment 500 may also include other components, such as, for example, a communications interface 530. One or more computer input devices 540 (e.g., pointing devices, keyboards, audio input devices, video input devices, haptic input devices, devices for receiving wired or wireless data transmissions, etc.) may be provided. The input devices 540 may include one or more touch-sensitive surfaces, such as force-sensitive track pads, the responses of which may be compensated or assessed as described herein. Various output devices 550, including touchscreen or touch-sensitive display(s) 555, may also be provided. The touchscreen or touch-sensitive display 555 may include one or more force-sensitive touch sensors, the responses of which may be compensated or assessed as described herein. The output devices 550 may include a variety of different audio output devices, video output devices, and/or devices for transmitting wired or wireless data transmissions.

The computing environment 500 may also include a variety of computer readable media for storage of information such as computer-readable or computer-executable instructions, data structures, program modules, or other data. Computer readable media may be any available media accessible via storage devices 560 and includes both volatile and nonvolatile media, whether in removable storage 570 and/or non-removable storage 580.

Computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the processing units of the computing environment 500.

The compensation techniques described herein may be implemented in computer-executable instructions, such as program modules, being executed by the computing environment 500. Program modules include routines, programs, objects, components, data structures, etc., that perform particular tasks or implement particular abstract data types. The techniques described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices.

The techniques may be implemented, in part or in whole, as hardware logic circuits or components, which may or may not include a processor. The hardware logic components may be configured as Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and/or other hardware logic circuits.

In one aspect, an electronic device includes a memory in which input instructions, force level assessment instructions, and output instructions are stored, and a processor coupled to the memory. The processor is configured through execution of the input instructions to obtain measurement data for a user interaction with a force-sensitive touch sensor, the measurement data being indicative of position information for the user interaction, amplitude information for the user interaction, and size information for the user interaction. The processor is further configured through execution of the force level assessment instructions to apply force level calibration data to the amplitude information and the size information in a force level assessment of the user interaction, the force level calibration data varying with user interaction size. The processor is further configured through execution of the output instructions to provide an output in accordance with the force level assessment.

In another aspect, an electronic device includes a memory in which input instructions, force level assessment instructions, and output instructions are stored, and a processor coupled to the memory. The processor is configured through execution of the input instructions to obtain measurement data for a user interaction with a force-sensitive touch sensor, the measurement data being indicative of position information for the user interaction and amplitude information for the user interaction. The processor is further configured through execution of the force level assessment instructions to implement a force level assessment of the user interaction based on the amplitude information. The processor is further configured through execution of the output instructions to provide an output in accordance with the force level assessment. The processor is further configured to compare an amplitude level indicated by the amplitude information with a threshold and, if the position information of the user interaction is indicative of a moving touch event, adjust a gain for the force-sensitive touch sensor if the amplitude level indicated by the amplitude information is offset from the threshold.

In yet another aspect, an electronic device includes a display having a force-sensitive touch sensor, a memory in which instructions are stored, and a processor coupled to the memory. The processor is configured through execution of the instructions to obtain measurement data for a user interaction with the force-sensitive touch sensor, the measurement data being indicative of position information for the user interaction, amplitude information for the user interaction, and size information for the user interaction. The processor is further configured to apply force level calibration data to the amplitude information and the size information in a force level assessment of the user interaction, the force level calibration data varying with user interaction size. The processor is further configured to provide an output in accordance with the force level assessment.

In connection with any one of the aforementioned aspects, the electronic device may alternatively or additionally include any combination of one or more of the following aspects or features. The processor is further configured through execution of the force level assessment instructions to determine a button press threshold from the force level calibration data based on a user interaction size indicated by the size information, the button press threshold being indicative of a threshold force level, and to compare an amplitude level indicated by the amplitude information with the button press threshold. The processor is further configured through execution of the output instructions to provide an indication of a button press event when the amplitude level exceeds or equals the button press threshold. The processor is further configured through execution of the force level assessment instructions to apply a function of the force level calibration data to the user interaction size to determine the button press threshold. The function is a non-monotonic function. The processor is further configured through execution of the force level assessment instructions to compare an amplitude level indicated by the amplitude information with minimum and maximum touch event thresholds of the force level calibration data, the minimum and maximum touch event thresholds being respective functions of user interaction size and indicative of a minimum force level and a maximum force level for a touch event, The processor is further configured through execution of the output instructions to provide an indication of a touch event when the amplitude level indicated by the amplitude information falls between the minimum touch event threshold and the maximum touch event threshold. The processor is further configured through execution of the force level assessment instructions to determine the force level for the user interaction based on the size information, the amplitude information, and the force level calibration data. The processor is further configured through execution of the force level assessment instructions to apply the size information and the amplitude information to a function defined by the force level calibration data to determine the force level. The processor is further configured through execution of the output instructions to provide an indication of the force level in a unit of force. The processor is further configured through execution of the force level assessment instructions to compare an amplitude level indicated by the amplitude information with a minimum touch event threshold of the force level calibration data, the minimum touch event threshold being indicative of a minimum force level for a touch event, and if the position information of the user interaction is indicative of a moving touch event, adjust a gain for the force-sensitive touch sensor if the amplitude level indicated by the amplitude information is offset from the minimum touch event threshold. An adaptation rate for adjusting the gain is adjusted in accordance with a speed of the moving touch event. The processor is further configured through execution of the force level assessment instructions to compare an amplitude level indicated by the amplitude information with a maximum touch event threshold of the force level calibration data, the maximum touch event threshold being indicative of a maximum force level for a touch event, and if the measurement data of the user interaction is indicative of a saturated touch event, adjust a gain for the force-sensitive touch sensor if the amplitude level indicated by the amplitude information is offset from the maximum touch event threshold. The processor is further configured through execution of the input instructions to receive raw sensor data from the force-sensitive touch sensor, and determine the position information of the measurement data by adjusting position data of the raw sensor data in accordance with a grid location indicated by the position data of the raw sensor data. The processor is further configured through execution of the input instructions to receive raw sensor data from the force-sensitive touch sensor, the raw sensor data comprising amplitude data and size data, and determine the amplitude information and the size information by adjusting the amplitude and size data of the raw sensor data in accordance with a grid location indicated by the position information. The electronic device further includes the force-sensitive touch sensor. The threshold is a minimum touch event threshold. The minimum touch event threshold is indicative of a minimum force level for a touch event. An adaptation rate for adjusting the gain is adjusted in accordance with a speed of the moving touch event. The measurement data is further indicative of size information for the user interaction. The force level assessment is further based on the size information. The threshold is indicative of a minimum force level for a touch event. The processor is further configured to determine the threshold based on a user interaction size indicated by the size information. The processor is further configured to compare the amplitude level indicated by the amplitude information with a maximum touch event threshold, the maximum touch event threshold being indicative of a maximum force level for a touch event, and if the measurement data of the user interaction is indicative of a saturated touch event, adjust a gain for the force-sensitive touch sensor if the amplitude level indicated by the amplitude information is offset from the maximum touch event threshold.

Any of the foregoing aspects of the electronic devices may be implemented as acts of a computer-implemented method. For instance, in one aspect, a computer-implemented method includes obtaining measurement data for a user interaction with a force-sensitive touch sensor, the measurement data being indicative of position information for the user interaction, amplitude information for the user interaction, and size information for the user interaction. The method further includes assessing a force level of the user interaction based on the amplitude information and the size information, and providing an output in accordance with the force level assessment.

In still yet another aspect, a computer-implemented method includes obtaining measurement data for a user interaction with a force-sensitive touch sensor, the measurement data being indicative of position information for the user interaction, amplitude information for the user interaction, and size information for the user interaction. The method further includes applying force level calibration data to the amplitude information and the size information in a force level assessment of the user interaction, the force level calibration data varying with user interaction size. The method further includes providing an output in accordance with the force level assessment.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. An electronic device comprising:
   a memory in which input instructions, force level assessment instructions, and output instructions are stored; and
   a processor coupled to the memory, the processor configured through execution of the input instructions to obtain measurement data for a user interaction with a force-sensitive touch sensor, the measurement data being indicative of position information for the user interaction, amplitude information for the user interaction, and size information for the user interaction;
   wherein the processor is further configured through execution of the force level assessment instructions to apply force level calibration data to the amplitude information and the size information in a force level assessment of the user interaction, the force level calibration data varying with user interaction size;
   wherein the processor is further configured through execution of the force level assessment instructions to compare an amplitude level indicated by the amplitude information with minimum and maximum touch event thresholds of the force level calibration data, the minimum and maximum touch event thresholds being respective functions of user interaction size and indicative of a minimum force level and a maximum force level for a touch event, respectively; and
   wherein the processor is further configured through execution of the output instructions to provide an output in accordance with the force level assessment.

2. The electronic device of claim 1, wherein the processor is further configured through execution of the force level assessment instructions to:
   determine a button press threshold from the force level calibration data based on a user interaction size indicated by the size information, the button press threshold being indicative of a threshold force level; and
   compare the amplitude level indicated by the amplitude information with the button press threshold.

3. The electronic device of claim 2, wherein the processor is further configured through execution of the output instructions to provide an indication of a button press event when the amplitude level exceeds or equals the button press threshold.

4. The electronic device of claim 2, wherein the processor is further configured through execution of the force level assessment instructions to apply a function of the force level calibration data to the user interaction size to determine the button press threshold.

5. The electronic device of claim 4, wherein the function is a non-monotonic function.

6. The electronic device of claim 1, wherein the processor is further configured through execution of the output instructions to provide an indication of a touch event when the amplitude level indicated by the amplitude information falls between the minimum touch event threshold and the maximum touch event threshold.

7. The electronic device of claim 1, wherein the processor is further configured through execution of the force level assessment instructions to determine the force level for the user interaction based on the size information, the amplitude information, and the force level calibration data.

8. The electronic device of claim 7, wherein the processor is further configured through execution of the force level assessment instructions to apply the size information and the amplitude information to a function defined by the force level calibration data to determine the force level.

9. The electronic device of claim 7, wherein the processor is further configured through execution of the output instructions to provide an indication of the force level in a unit of force.

10. The electronic device of claim 1, wherein the processor is further configured through execution of the force level assessment instructions to:
    compare the amplitude level indicated by the amplitude information with the minimum touch event threshold of the force level calibration data; and
    if the position information of the user interaction is indicative of a moving touch event, adjust a gain for the force-sensitive touch sensor if the amplitude level indicated by the amplitude information is offset from the minimum touch event threshold.

11. The electronic device of claim 10, wherein an adaptation rate for adjusting the gain is adjusted in accordance with a speed of the moving touch event.

12. The electronic device of claim 1, wherein the processor is further configured through execution of the force level assessment instructions to:
    compare the amplitude level indicated by the amplitude information with the maximum touch event threshold of the force level calibration data; and
    if the measurement data of the user interaction is indicative of a saturated touch event, adjust a gain for the force-sensitive touch sensor if the amplitude level indicated by the amplitude information is offset from the maximum touch event threshold.

13. The electronic device of claim 1, wherein the processor is further configured through execution of the input instructions to:
    receive raw sensor data from the force-sensitive touch sensor; and
    determine the position information of the measurement data by adjusting position data of the raw sensor data in accordance with a grid location indicated by the position data of the raw sensor data.

14. An electronic device comprising:
    a memory in which input instructions, force level assessment instructions, and output instructions are stored; and
    a processor coupled to the memory, the processor configured through execution of the input instructions to: (1) obtain measurement data for a user interaction with a force-sensitive touch sensor, the measurement data being indicative of position information for the user interaction, amplitude information for the user interaction, and size information for the user interaction, (2) receive raw sensor data from the force-sensitive touch sensor, the raw sensor data comprising amplitude data and size data, and (3) determine the amplitude information and the size information by adjusting the amplitude and size data of the raw sensor data in accordance with a grid location indicated by the position information;
    wherein the processor is further configured through execution of the force level assessment instructions to apply force level calibration data to the amplitude information and the size information in a force level assessment of the user interaction, the force level calibration data varying with user interaction size; and
    wherein the processor is further configured through execution of the output instructions to provide an output in accordance with the force level assessment.

15. The electronic device of claim 1, further comprising the force-sensitive touch sensor.

16. An electronic device comprising:
a memory in which input instructions, force level assessment instructions, and output instructions are stored; and
a processor coupled to the memory, the processor configured through execution of the input instructions to obtain measurement data for a user interaction with a force-sensitive touch sensor, the measurement data being indicative of position information for the user interaction and amplitude information for the user interaction;
wherein the processor is further configured through execution of the force level assessment instructions to implement a force level assessment of the user interaction based on the amplitude information;
wherein the processor is further configured through execution of the output instructions to provide an output in accordance with the force level assessment; and
wherein the processor is further configured to:
compare an amplitude level indicated by the amplitude information with a threshold; and
if the position information of the user interaction is indicative of a moving touch event, adjust a gain for the force-sensitive touch sensor if the amplitude level indicated by the amplitude information is offset from the threshold.

17. The electronic device of claim 16, wherein the threshold is a minimum touch event threshold.

18. The electronic device of claim 17, wherein the minimum touch event threshold is indicative of a minimum force level for a touch event.

19. The electronic device of claim 16, wherein an adaptation rate for adjusting the gain is adjusted in accordance with a speed of the moving touch event.

20. The electronic device of claim 16, wherein:
the measurement data is further indicative of size information for the user interaction;
the force level assessment is further based on the size information;
the threshold is indicative of a minimum force level for a touch event; and
the processor is further configured to determine the threshold based on a user interaction size indicated by the size information.

21. The electronic device of claim 20, wherein the processor is further configured to:
compare the amplitude level indicated by the amplitude information with a maximum touch event threshold, the maximum touch event threshold being indicative of a maximum force level for a touch event; and
if the measurement data of the user interaction is indicative of a saturated touch event, adjust a gain for the force-sensitive touch sensor if the amplitude level indicated by the amplitude information is offset from the maximum touch event threshold.

22. An electronic device comprising:
a display comprising a force-sensitive touch sensor;
a memory in which instructions are stored; and
a processor coupled to the memory;
wherein the processor is configured through execution of the instructions to:
obtain measurement data for a user interaction with the force-sensitive touch sensor, the measurement data being indicative of position information for the user interaction, amplitude information for the user interaction, and size information for the user interaction;
apply force level calibration data to the amplitude information and the size information in a force level assessment of the user interaction, the force level calibration data varying with user interaction size;
compare an amplitude level indicated by the amplitude information with minimum and maximum touch event thresholds of the force level calibration data, the minimum and maximum touch event thresholds being respective functions of user interaction size and indicative of a minimum force level and a maximum force level for a touch event, respectively; and
provide an output in accordance with the force level assessment.

* * * * *